W. B. OLIVER.
DEVICE FOR DETERMINING RELATIVE GEOGRAPHICAL LOCATIONS AND THE LIKE.
APPLICATION FILED DEC. 31, 1912.
1,206,027.
Patented Nov. 28, 1916.
3 SHEETS—SHEET 1.
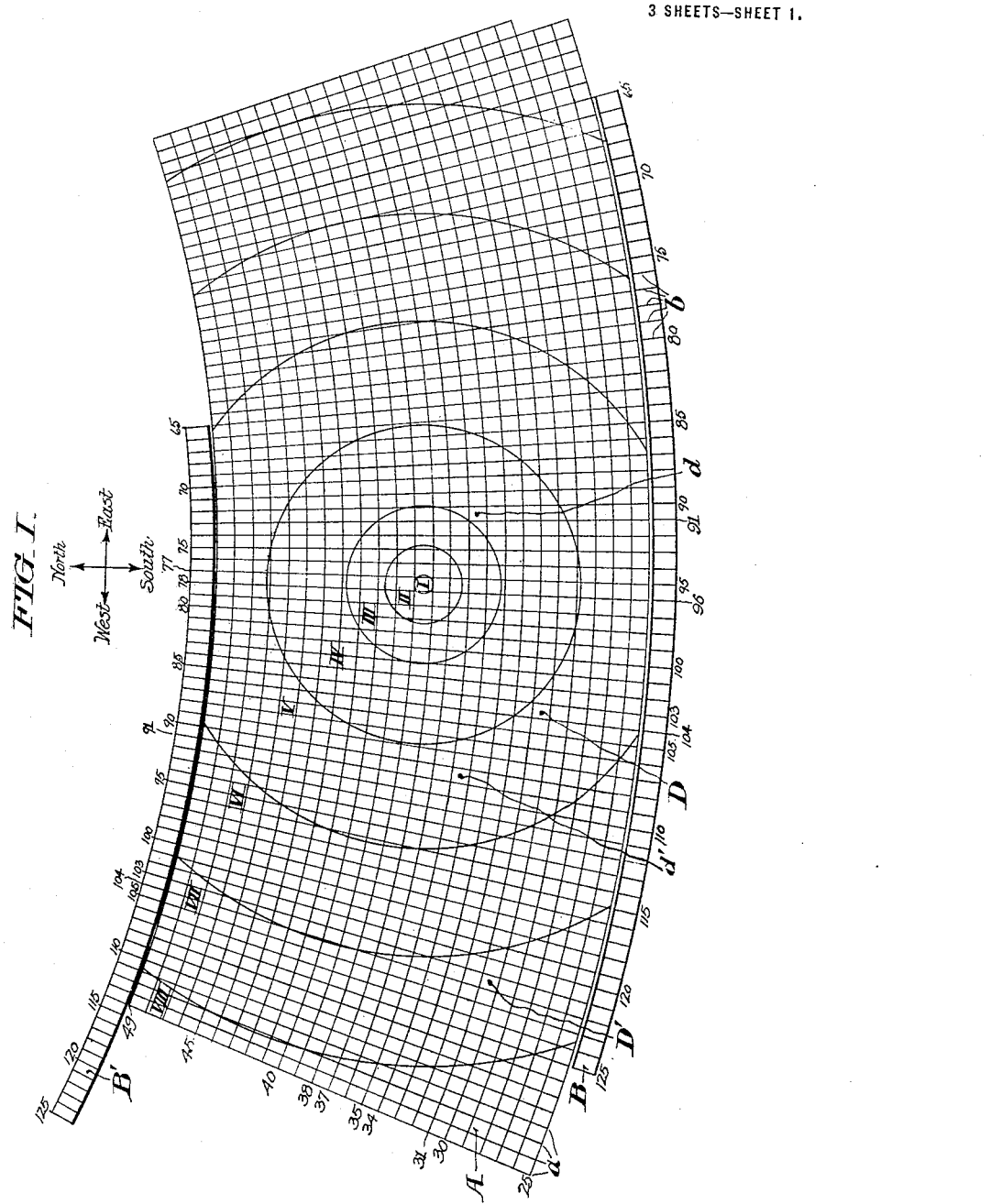

W. B. OLIVER.
DEVICE FOR DETERMINING RELATIVE GEOGRAPHICAL LOCATIONS AND THE LIKE.
APPLICATION FILED DEC. 31, 1912.
1,206,027.
Patented Nov. 28, 1916.
3 SHEETS—SHEET 2.
FIG. II.
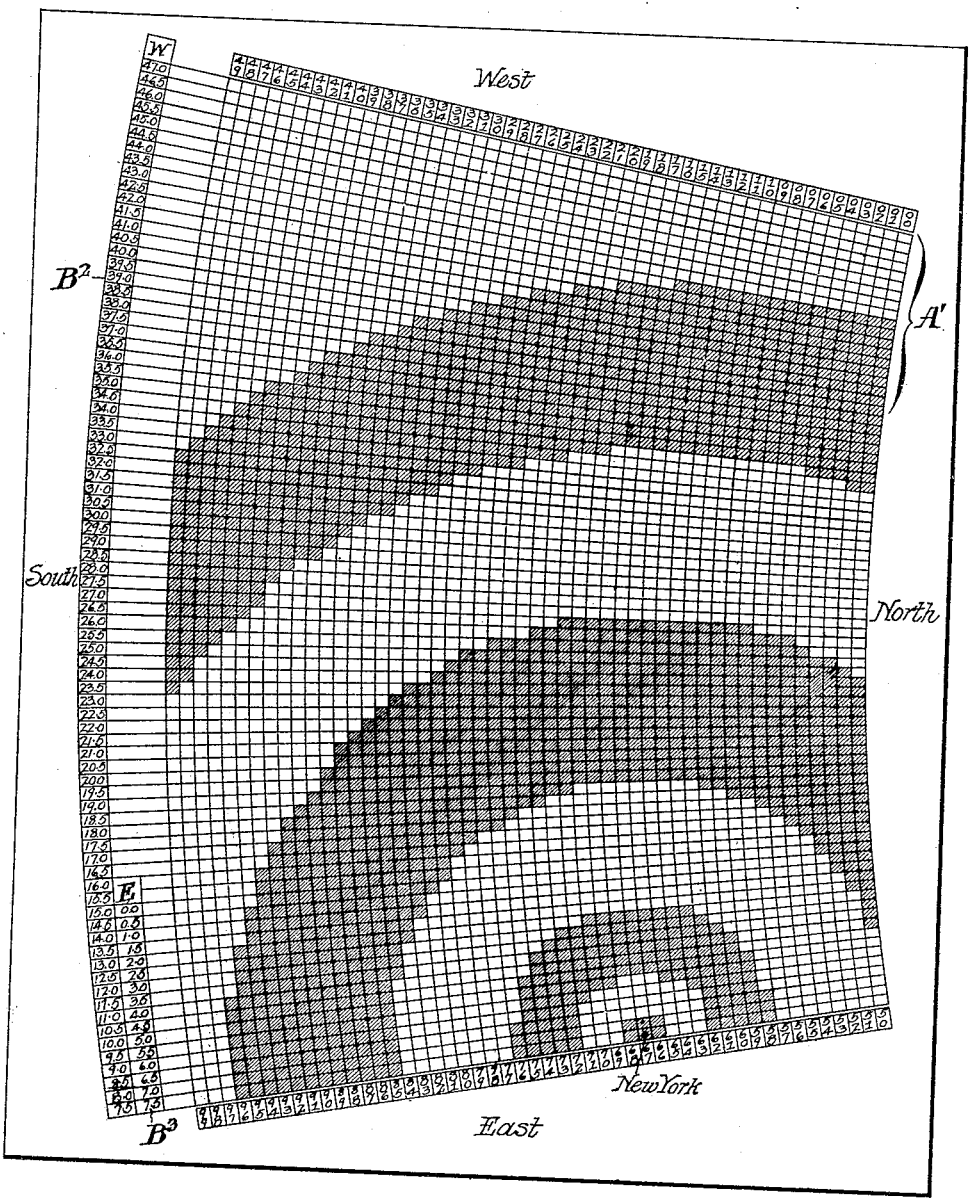
Witnesses
John C. Bergner
James H. Bell
Inventor
William B. Oliver,
By Raley & Paul
Attorneys W. B. OLIVER.
DEVICE FOR DETERMINING RELATIVE GEOGRAPHICAL LOCATIONS AND THE LIKE.
APPLICATION FILED DEC. 31, 1912.
1,206,027.
Patented Nov. 28, 1916.
3 SHEETS—SHEET 3.
FIG. III.
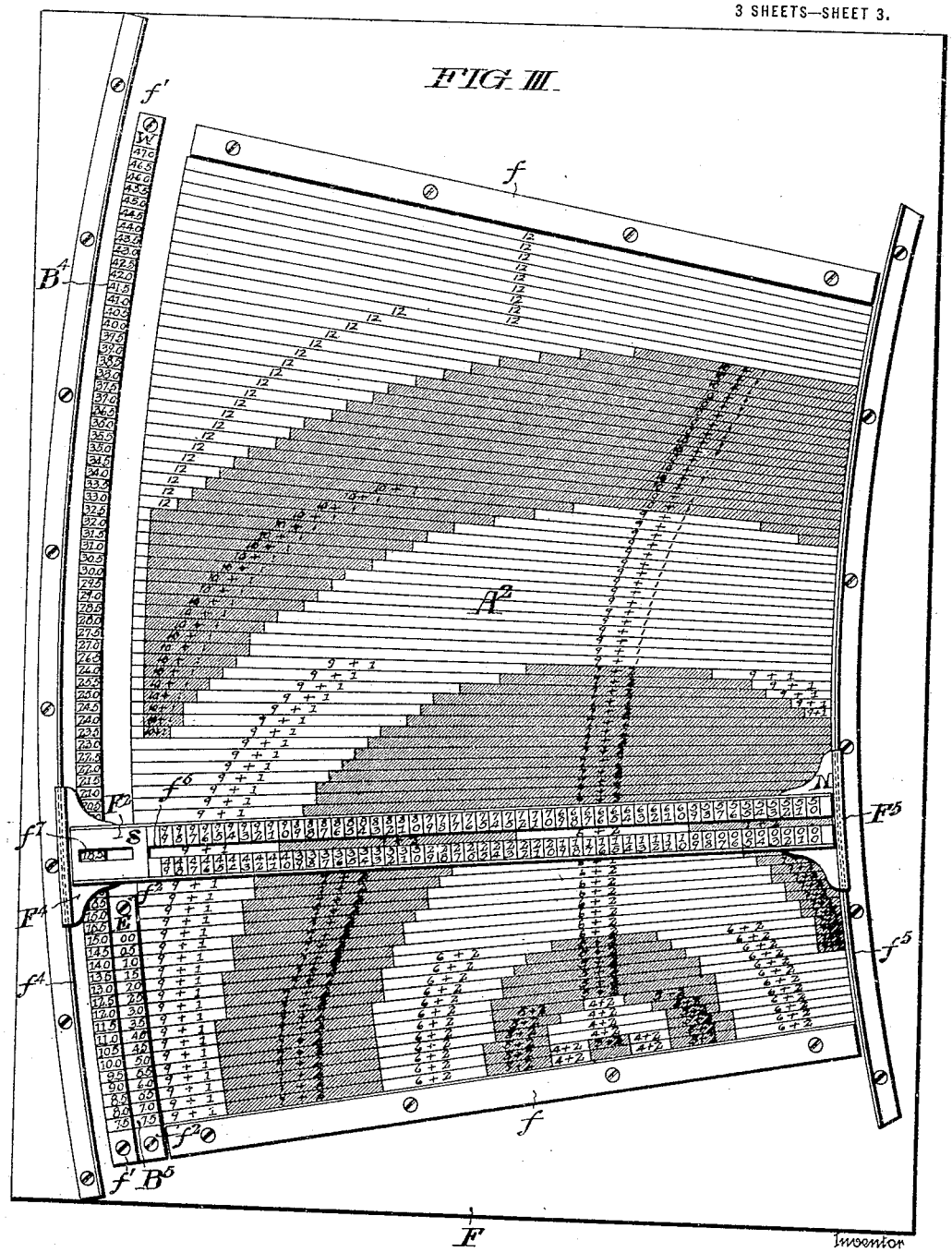
Witnesses
John C. Bergner
James H. Bell
Inventor
William B. Oliver,
By Raey & Paul
Attorneys

UNITED STATES PATENT OFFICE.

WILLIAM B. OLIVER, OF COLLINGSWOOD, NEW JERSEY.

DEVICE FOR DETERMINING RELATIVE GEOGRAPHICAL LOCATIONS AND THE LIKE.

1,206,027.  Specification of Letters Patent.  Patented Nov. 28, 1916.

Application filed December 31, 1912. Serial No. 739,522.

*To all whom it may concern:*

Be it known that I, WILLIAM B. OLIVER, of Collingswood, in the county of Camden and State of New Jersey, have invented certain new and useful Improvements in Devices for Determining Relative Geographical Locations and the like, whereof the following is a specification, reference being had to the accompanying drawings.

The immediate purpose to which my invention is particularly addressed is the ready determination of the "zone" relation between any two stated localities within a given area, having in view the peculiar conditions arising from the recent act of Congress for the establishment of a system of parcel post delivery. It will be understood, however, that it is applicable to any circumstances where a generally similar method of ascertaining and indicating relative geographical locations is desired. In order to facilitate an understanding of the specific purpose above mentioned, I will briefly refer to said act of Congress, which provides that, for the purposes of parcel post delivery, the United States and its Territories and possessions, (excepting the Philippine Islands) shall be divided into units of area, thirty minutes square, identical with a quarter of the area formed by the intersecting parallels of latitude and meridians of longitude, represented on a postal map or plan, and that such units of area shall be the basis of eight postal zones. The first of these zones includes all territory lying within a radius of approximately fifty miles from the center of any given unit of area. The second zone includes the territory lying outside of the first one and lying within a radius of approximately one hundred and fifty miles from said center. The third zone includes the next outside territory lying within a radius of approximately three hundred miles. The fourth zone includes the next outside territory lying within a radius of approximately six hundred miles. The fifth zone includes the next outside territory lying within a radius of approximately one thousand miles. The sixth zone includes the next outside territory lying within a radius of approximately fourteen hundred miles. The seventh zone includes the next outside territory lying within a radius of approximately eighteen hundred miles. The eighth zone covers all territory outside of the seventh. The rates for the transportation of parcels of any given weight vary in accordance with the zone distance, in the manner prescribed by said law. It is understood that for the purpose of carrying out the provisions of this act maps have been prepared, showing the actual geographical boundaries or outlines of the necessary territory, and that meridians of longitude and parallels of latitude are imprinted upon said maps, at intervals of thirty minutes in each division, so as to graphically subdivide said territory into the actual number of units of area comprised within the occupied portions thereof, said units being numbered serially by relation to latitude, and also numbered serially by relation to longitude. The designating numerals (which are arbitrary) are imprinted within the graphic boundaries of each unit. For each unit of area in which a mailing point or "home station" is situated, a separate map is prepared, upon which are imprinted a plurality of concentric circles, representing graphically the several postal zones as they exist with relation to the central point of that particular unit. It is, therefore, necessary to actually print and furnish as many different maps as there are units of area, and it is believed that for present purposes, upward of thirty-five hundred different maps will be required. It will also be understood that a guide book, or key, is to be used, in which the various home and delivery stations are indicated in alphabetical or other convenient order, the name of each station having affixed to it the two numerals which indicate respectively the latitudinal and longitudinal position of the unit of area in which it lies. The method of procedure, under these circumstances, is for the post-master at the home station to ascertain in the guide book the numerical designations of the unit in which the desired delivery point lies, and then, by finding that unit upon the map, to note the zone circles between which it is included, in order to ascertain the zone distance from the home station.

The ultimate purpose of my invention is to simplify and facilitate the procedure required for ascertainment of the zone relation, between any two points, and to this end the principal objects are as follows: First. To greatly reduce the number of different maps or charts required, and incidentally to dispense with any graphic representation of the geographical boundaries or outlines of the territory. Second. To so indicate the zones as to eliminate doubt in regard to the zone location of any particular station, this desideratum arising from the fact that the units are, so to speak, quadrangular, while the zones are circular, and hence in the graphic representation on the maps above referred to, there are some instances where the lines intersect in a manner which may be productive of uncertainty in regard to the zone distance of some particular unit. Third. To afford a mechanical means for facilitating the finding and direct reading of a zone distance.

Before proceeding to describe the accompanying drawings, I deem it proper to point to the fact that while the language of the act of Congress refers to the units of area as being thirty minutes square, the actual figures, when graphically represented upon a map-projection in which the meridians of longitude converge, but in which the parallels of latitude are concentric segments, are not squares, but substantially trapezoids. Furthermore, as a consequence of this, the units of area themselves diminish in actual size as they progress northwardly. Obviously, if a Mercator projection were to be employed, the graphically expressed units of area would be rectangular in outline, and this method of representation may be found desirable. My invention is adaptable to either method of representation of the units of area, but since it is understood that the immediate intention of the Post Office Department is to employ maps in which the meridians of longitude converge, while the parallels of latitude are segmental, the organization of my device shown in the drawings is that which is appropriate for such a system of representation.

In the accompanying drawings, Figure I, represents diagrammatically in plan view, a device illustrating the underlying principle of my invention, but in order to avoid confusion through the multiplicity of lines, I have not represented graphically thereon subdivisions of thirty minutes of latitude, or longitude, for the territorial area supposed to be comprised (which may be considered as extending about 3600 miles east and west at the general latitude of the United States), but have indicated meridians and parallels situated one degree apart. Fig. II, is a plan view of a device embodying my invention in a form adapted for practical use in connection with subdivisions of thirty minutes both of latitude and longitude, for the entire United States, thus forming the actual units of area contemplated by the present Post Office regulations, as above stated. Fig. III, is a plan view of the device, in a form similar to that shown in Fig. II, but having an additional element combined therewith, viz. an elementary form of mechanical means for facilitating the finding and reading of a zone relation, or other desired data.

Since designating numerals are intended to be actually imprinted upon portions of the device itself, and hence are appropriately shown, as such, upon the drawings, I shall, in the detailed description, use letters of reference to indicate the several parts, as far as possible.

Referring now to Fig. I, which, as above stated, is diagrammatic in its character, A, represents a flat chart-like element of paper, paste-board, or other similar material, which may be conveniently shaped as an annular segment in outline, having inscribed upon it 25 concentric-segmental arcs, which are supposed to be serially numbered from 25 to 49, both inclusive, as they progress toward their common center, or "northwardly", with relation to the points of the compass indicated above said figure. These arcs may be considered as corresponding with actual parallels of latitude, the arcs 25 and 49 representing the parallels between which lie the extreme north and south limits of the United States. There are also inscribed upon said chart a number of converging straight lines, (a typical group of which is indicated by the letter of reference a) radial to said arcs, and located symmetrically at a distance from one another corresponding to a degree of longitude. The surface of the element A, (which will for convenience be referred to as a chart), is, therefore, graphically subdivided into a large number of approximately trapezoidal figures, each one of which may be supposed to represent a unit of area for the purposes contemplated, and these units of area may be designated by reference to their respective inclosing lines of latitude and longitude, instead of by the arbitrary numerals which will be employed in the more highly organized form of device. It will also be noted that at the center of figure of the chart A, a small circle marked with the Roman numeral I, is inscribed, which substantially includes one of said units of area. Outside of this circle, and concentric therewith, are imprinted six other circles, or segments of circles, the interspaces forming zones, within which are marked the Roman numerals II, III, IV, V, VI, VII, and VIII. The unit of area lying within the innermost circle I, and the several zones included between each pair of adjacent circles may be considered as representing the eight zones established by the postal regulations with reference to the central point of the unit of area substantially co-extensive with the circle I. Since the eighth zone (marked VIII) includes everything outside of a designated circle, it is, of course, unnecessary to extend the chart area graphically beyond the circle which forms the innermost boundary of said zone. By reference to the above figures, it will be noted that said chart A, is capable of including, either east or west of its center of figure, the total zone radius applicable to the entire territory of the United States, that is to say, there are represented twenty-four degrees of latitude, and a sufficient number of meridians of longitude to include the entire zone distance of 1800 miles either east or west of the central point of the zone I, for the latitude limits of the United States. It will also be noted that since the zone circles are concentric with the center of figure of the chart A, those zones, which only appear as segments, are symmetrical north, south, east, and west, with relation to the central point.

Combined with the chart A, but mounted independently thereof, is a flat band or strip indicated at B, which is preferably an annular segment in outline, and which may be constructed of material similar to the chart A, said band being movable with relation to the chart A, but capable of being maintained in any desired relative position. Said segmental band B, is graphically divided by radial lines, such as b, corresponding in location and direction with prolongations of a certain number of the meridians of longitude, shown upon the chart A, but the band itself may subtend an arc of less extent than the total arc of the chart A. The said radial lines upon the band which may be considered as meridian terminal marks, are supposed to be numbered serially from 65 to 125, both inclusive, in correspondence with the actual meridians of longitude which include the east and west limits of the United States. For convenience of nomenclature I shall employ the term "longitude band," to designate said element.

Referring now to the relation of the chart A, to the longitude band B, when the latter is in the position indicated, it will be seen that the trapezoidal figure included within central circle I, lies between parallels of latitude 37 and 38, and between meridians of longitude 95 and 96, and thus represents the actual location of a unit of area situated near the southeastern corner of the State of Kansas, which for present purposes may be regarded as approximately the central point of figure of the United States.

Let it now be supposed that the zone distance or zone relation, is to be ascertained between the central point of the circle I, which I will term the home station, and a point marked D, in the unit of area lying between parallels of latitude 30 and 31, and between meridians of longitude 103 and 104. Assuming that a guide book, or key describes the unit of area for said point D, by reference to these numerals of latitude and longitude, as for instance, 30—31; 103—104; the user of the device would proceed to locate upon the chart said unit of area by following the proper parallels and meridians to their intersection, and he would see that said point D, lies within the zone marked V, which, as above stated, is supposed to be the fifth zone from the home station above mentioned. The said point D, (which may be termed a "delivery point"), lies to the west of the central point of the circle I, but assuming that it was desired to ascertain the zone relation of another delivery point marked d, lying to the eastward of the home station, and that it was found by reference to the guide book, that the unit of area which included said delivery point d, lies between parallels 34, and 35, and between meridians 90 and 91, the user, having located that unit of area by reference to the intersection thereof upon the chart, would find that said delivery point d, lies within the fourth zone. Let it now be supposed that the said chart is to be utilized for a home station having the same latitude as the station within the circle I, but a different longitude. For the purpose of illustration, I have selected, as such other home station, a unit of area corresponding substantially to that which includes Richmond, Virginia. The latitude may be assumed to be the same, but the longitude now lies between meridians 77, and 78. To meet these new conditions the longitude band is shifted "westward" along the edge of the chart until the meridian terminals marked 77, and 78, coincide with the ends of the meridians between which the unit of area at the circle I, is situated. In order to show this more clearly I have indicated a second band marked B', at the upper edge of the chart, adjusted in the position just specified, but it will be understood of course that such second band is not an additional element, being merely a conventional representation of the longitude band B, when arranged in a new position relative to the chart A. Hence in following the further details the indications of longitude shown on the segmental band B, will now be disregarded. Let it now be supposed that the zone distances to the same delivery points as those formerly selected are to be ascertained. The user, taking from the guide book, the designation before given, of the unit of area which includes the first delivery point to be located (viz. latitude 30—31; longitude 103—104), and following out these parallels and meridians to their intersection by reference to the shifted longitude band B', will find that said delivery point lies at D', which is in the seventh zone from the home station. Recurring now to the other delivery point, (which lies to the eastward of the home station in the instance first described and which was formerly indicated by the letter $d$), the latitude and longitude designation of the unit of area for said delivery point, being 34—35; 90—91, the user will follow these parallels and meridians to their intersection and by reason of the changed position of the longitude band, the position of said point will be that indicated at $d'$, or in the fifth zone, instead of the fourth, and to the west of the home station, instead of to the east.

From the above statement it will be apparent that the longitude marks can be read from a longitude band applied along either the north or south edge of the chart A, or, if desired, from bands similarly applied at both said edges, and that a single chart A, having a longitude band, capable of adjustment, will suffice for every possible longitudinal location of any home station unit of area having a given latitude.

In the chart as shown diagrammatically in Fig. I, the subdivisions of latitude and longitude have been arbitrarily considered as corresponding to whole degrees in either direction, while if they had been in conformity with the subdivisions contemplated by the act of Congress, they would have been thirty minutes in each direction, and consequently the chart would have comprised four times the number of units of area. Counting the actual units in any north and south row of Fig. I, it will be seen that there are 24 units in each north and south row, and hence if the subdivisions were assumed to be thirty minutes apart, instead of one degree apart, there would have been 48. The meridians of longitude inscribed upon the chart and upon the meridian terminals inscribed upon the longitude band, would also be doubled in number, but the arc represented by said band would be the same as before. Since, as has been above explained, the chart actually shown in Fig. I, can, by shifting the longitude band, be made available for any home station whose unit of area lies between the same adjacent parallels of latitude, it will be obvious that in order to exhibit the units of area and distance zones for every point within the United States, only as many different charts would be required as there are units of area in a north and south row, of the required extent. In actual practice 49 such charts would suffice, instead of upward of 3500, which it is believed, are now deemed necessary, as before stated. The longitude bands for all of these charts can be identical with one another, and hence interchangeable.

Attention is now directed to certain further features of the chart element. The diagrammatic view of Fig. I, shows the units of area as extending similarly both east and west of the center of figure. As, however, the zones are symmetrical east and west of said center, no matter what the latitude of the center may be, it will be manifest that only one half of the chart figure need be employed, since both longitude relations can be read on the same side of the center, by simply noting whether the number of half degrees to be ascertained is east or west and locating the proper meridians accordingly.

Obviously, as the central point of the zones progressed northwardly or southwardly in comparison with the one actually shown in Fig. I, the positions of the zone circles and segments would be shifted with relation to the north and south boundaries of the chart, but this fact does not affect the symmetry of the zones east and west of the center. The developments of the invention permitted by the facts above stated will be apparent upon reference to Fig. II.

In Fig. II, I have shown a chart A', adapted to the city of New York, as a home station, and I have graphically indicated upon said chart units of area formed by parallels of latitude and meridians of longitude situated 30 minutes apart. In this instance it will be understood that north lies to the right hand as Fig. II, is viewed, south to the left hand, west at the top and east at the bottom. On the parcel post maps, as supplied by the Government, the numerical designation of the unit area in which New York city is located is 767 of which the 7 in hundreds place is the longitude reference and 67 in unit and tens places is the latitude reference. This plan of making the unit area numbers on the Government chart designate both the longitude and latitude of the several areas is adhered to throughout the whole parcel post scheme and has necessarily been followed by me in adapting my invention to the Government charts. For convenience I have substituted the number 7 for 700, 8 for 800, 7.5 for 750, 8.5 for 850 and so on for longitudinal references throughout my whole system of charts. Referring now to the designation of the units of area by reference to latitudinal subdivisions, or latitude belts, it will be noted that at the top of the chart, each belt is marked with a double number, thus the extreme right hand belt is marked 00, the next is 01, the next is 02, and so on, these figures being printed vertically, with relation to each other, instead of horizontally, in order to economize space. Reading the figures vertically downward, and progressing from right to left, it will be noted that they proceed from 0 to 49, both inclusive, so that there are actually 50 complete latitude belts, which number is slightly in excess of that required. Referring now to the bottom of the chart, it will be seen that a second series of numerals is applied to the latitude belts, and reading these numerals vertically downward and progressing from right to left, they run from 50 to 99, both inclusive. Hence, any latitudinal subdivision, or latitude belt can be considered as bearing two numbers, viz. the extreme right hand belt may be designated either 00, or 50, the next one may be either 01 or 51, and so on. This arrangement is adopted because upon the maps actually printed by the Post Office Department the numerals of the adjacent units of area, upon any given latitude belt proceed by intervals of 50, that is to say, New York is located in the unit of area whose arbitrary latitude designation is 67, while the units immediately adjacent to it, on the east and west, have the latitude numeral 17, and these again are flanked eastward and westward by units whose latitude numeral is 67, and so on. It will also be noted that there are represented at the left hand side of said chart A′, two longitude bands, respectively, marker $B^2$ and $B^3$. The longer segment $B^2$, comprises a series of numerals commencing at the lower end with 7.5, and continuing upwardly as 8.0, 8.5, and so on up to 47.0, inclusive, inscribed between the meridian terminal marks, while the shorter segment $B^3$, comprises a series of numerals commencing, at the lower end, with 7.5 and progressing upwardly from 7.5 to 0.0, inscribed between its meridian terminal marks. The series of numbers on the longer segment $B^2$, comprises the units of area of longitude lying west of New York, while the series upon the shorter segment $B^3$, comprises the numerals of longitude lying east of New York, these relations being appropriately indicated by the letters W and E respectively at the upper ends of the respective bands. Upon the map as actually prepared by the Post Office the unit of area in which New York lies is marked 767, the first numeral indicating the longitudinal subdivision, the last two indicating the latitudinal subdivision. To appropriately reproduce these numerals, upon the longitudinal band, for the purposes of my invention, I, therefore, comprise under the prefix of any integer, such as 7, two subdivisions, one representing the unit of longitude which corresponds with a latitudinal designation lying between 0 and 49, while the other comprises a unit of longitude whose latitudinal designation is noted by numerals lying between 50 and 99. As before stated, this particular chart is prepared for use in any unit of latitude similar to that in which New York lies, and as the longitude bands are shown in said figure, the combination is specifically arranged for New York, as a home station, as is indicated by the application of that name upon the figure. Upon the postal map the numeral applied to the unit of area of New York is 767. Therefore, the appropriate longitude subdivision is that numbered 7.5 because the numeral 67, is in excess of 50. Proceeding from New York as a center, the several zones are depicted as indicated by the alternate clear spaces and shaded spaces, and to eliminate any question of doubt as to the subdivision of any particular unit of area, or the intersection of zone lines with the other subdividing lines, it will be noted that the graphic representations of the said zones proceed with what may be termed blocked edges as distinguished from true circular outlines. In this manner all possible confusion as to the position of any particular unit of area, with reference to a zone, is absolutely avoided.

Referring now to the development above mentioned, of the fundamental principle diagrammatically illustrated in Fig. I, it will be noted that in Fig. II, the appearance of the chart A′, is different from that of the chart A, in several particulars, viz; first, the latitude has been shifted northwardly, and hence the zone circles and segments are thrown into different positions relatively to the north and south boundaries. Furthermore, by eliminating one-half of the chart area east and west, the zone representations are correspondingly reduced in the extent of their respective arcs, because the same representation of a zone can be utilized for locations either east or west of the central point, by using either the longitude band marked "E," or that marked "W." The procedure, with this embodiment of the device is similar to that before explained. The designation of the delivery point being ascertained from the guide book, its position on the chart is found by noting the intersection of the appropriate meridians and parallels. If the designating latitude numeral lies between 0 and 40, inclusive, the longitude subdivision marked with an integer is followed, but if the latitude numeral be 50, or upward, the longitude subdivision marked with the decimal addition .5 is followed.

Referring now to Fig. III, I have shown therein a development of my invention, which includes the combination of the elements heretofore described in further combination with a mechanical means for facilitating the reading off of zone relations. In said figure, $A^2$, represents a chart element intended for use throughout the range of units having the latitude indicated in Fig. II, and arranged for the longitude of New York in the same manner as the elements shown in Fig. II, that is to say, it comprises the longitude bands $B^4$, $B^5$, with the numerals progressing as before for longitude east and west of New York. Said chart and its longitude bands are indicated as secured upon a table F, by means of clamping plates $f$, $f'$, $f^2$, respectively. I also secure upon said table segmental raised tracks $f^4$, $f^5$, respectively, concentric with the general curvature of the segmental chart. An elongated scale-piece $F^2$, is mounted at its ends upon supports $F^4$, $F^5$, respectively, which are adapted to run smoothly upon segmental tracks $f^4$, $f^5$, respectively. Said scale-piece $F^2$, is of a length sufficient to extend over the entire area of the chart $A^2$, and the longitude segments $B^4$, $B^5$, and is provided with an elongated slot $f^6$, extending across the necessary portion of the chart $A^2$, and slightly tapered so that the area of the opening substantially corresponds with the interspace between two adjacent meridians of longitude. Another slot $f^7$, is formed in said scale-piece at the region adjacent to the longitude bands, the length of said slot being sufficient to include the width of both of said bands, while the width of the slot corresponds to the distance between the terminals of two meridians. As shown, the letters N, and S, indicating north and south, may be appropriately marked upon said scale-piece in correspondence with the relation of the device, as a whole, to the point of the compass. Upon the scale-piece are inscribed latitude terminals, corresponding to the several parallels, with numbers in the intervening spaces similar to those shown at the top and bottom of Fig. II. By sliding said scale-piece along the tracks until its slot coincides with any subdivision of the longitude meridians, it is obvious that the numbers of the latitude units can be read in immediate juxtaposition to the region of the chart where the delivery point is located. It will be noted that upon the lower half of said scale-piece the numerals from zero to 49, are imprinted serially in the respective subdivisions, while in the upper half the numerals from 50 to 99, are printed upon the same subdivisions. Either the upper scale or the lower one can therefore be used in connection with any latitude subdivisions, and the selection of the upper or lower scale for reading depends, as above explained, upon which one of the two longitude units denoted by the same integer is to be employed. Thus, in the case actually shown, the longitude subdivision is 18.5 showing that the latitude designation is one of 50, or upward, therefore the upper scale, comprising the numerals from 50 to 99, will be the one to be read. Had the slot $F^7$, been located over the next lower longitude subdivision, viz. 18, the lower half of the scale would have been used with the numerals from zero to 49 inclusive.

Referring now to the graphic representations upon the chart $A^2$, it will be noted that the parallels of latitude have been practically eliminated, the only portions thereof remaining imprinted upon the chart being those marking the boundaries of each zone, pursuant to the block system above explained. This elimination of the latitude parallels is rendered possible by the fact that the eye no longer needs them as a guide for ascertaining the latitude of any particular point, because the markings of the latitude subdivisions upon the sliding scale-piece brings said latitude designations into immediate juxtaposition with the portion of the chart sought to be examined. In other words, the sliding of the scale piece along its tracks, and consequent progressive movement of the latitude sub-divisions marked thereon may be considered as representing the equivalent of the actual extension of the latitude parallels throughout the entire length of the chart. It will also be noted that there are imprinted upon the several zones, certain numerals; those in the innermost zone bears upon its outer subdivisions the numerals 3+2, the next zone bears upon each of its longitude subdivisions the numerals 4+2, the next zone bears upon each longitude subdivisions the numerals 5+2, the next zone 6+2, the next zone 7+2, the next zone 9+1, the next zone 10+1, and the area comprised in the seventh zone the numerals 12. These figures respectively represent the postal rates for the different zones, since it may be found convenient to directly read the rate from the device itself, in connection with any given delivery point, instead of first noting the number of the zone in which said delivery point lies, and then referring to the table giving the rate for said zone.

To give a concrete illustration, let us suppose that a parcel is to be sent from New York to a delivery point whose designation in the guide book is 18.70, the scale piece is slid along its track until the slot $f^7$, stands over the longitude subdivision 18.5 as shown. The latitude subdivision 70, is then found, and immediately below it, in the white space are imprinted the numerals 6+2, so that the official at once reads the rate. Similarly, if the designation of the delivery point had been 18.90, the scale would have been moved to the position which it now occupies, with the slot $f^7$, over the numeral 18.5, and on referring to the numeral 90, of the latitude scale, it will be seen that it lies opposite to the zone on which are inscribed the numerals 7+2, the official thus knows that this is the rate to said delivery point.

Obviously, any method of indicating the zones or supplying the desired information might be employed upon the chart, as for instance, difference in color, difference in shaded lines, numerals, or any other designating marks, but I have in this instance, shown what I believe to be the most complete markings for the zones, because at a glance the ultimate information desired, viz. the actual reading of the delivery point, is instantly afforded to the eye.

Referring now to the theoretical subdivisions of the longitude-band so as to permit the employment of east and west bands starting from a common point, it will be noted that such subdivisions may be physically accomplished in the following manner: The figures characteristic of the subdivisions upon the band may be imprinted upon both sides of a strip (preferably an annular segment in outline), the numerals upon the subdivisions upon both sides running in the same direction, but those upon one side being upside down with relation to those upon the other. Furthermore, the arrangement of the numerals upon one side is displaced by one space with reference to the corresponding numerals on the opposite side, for instance, the numeral 7.5 upon one side is directly opposite to the numeral 8, upon the other side, and so on. Hence when the band is physically bisected upon the line running between the numerals 7, and 7.5 (as in the instance shown in Fig. III), and the cut off portion lying to the eastward of 7.5, is turned over, it will be found that each strip terminates with a division in which are inscribed the numbers 7.5 and that the eastern end progresses from 7.5 to 00, while the western end progresses from 7.5 to 47. The purpose of this displacement of the numerals by one space will be obvious when it is noted that in order to have, upon both cut portions of a single band, a subdivision commencing with a numeral identical with that upon the other band, it is necessary that the two similar numerals shall lie on opposite sides of the line of physical subdivision.

Referring now to that element of the combination which for purposes of convenience has been termed the chart, it will be obvious from the foregoing description that it is not necessary to graphically inscribe thereon the subdividing lines in their entirety, the only essential points being that the area represented upon said chart should correspond to a group of units of area definitely related to one another (though not necessarily of the same dimensions), the limits of said units of area being determined either actually or theoretically by coördinate lines, in this instance parallels of latitude and meridians of longitude; also that there should be means for denoting the respective units by reference to what may be considered as their longitudinal and latitudinal positions, such means including appropriate markings, whether of numerals or otherwise, in correspondence with a known system of denoting localities, and also that concentric zones should be indicated in some convenient manner upon said chart, arranged concentrically with relation to a definite unit of area, actually or theoretically represented upon the chart, the contours of said zones being definitely related to the distances of the units of area, included within the zone borders, from the central point. Thus, as before explained, in the chart shown in Fig. II, all the dividing lines are represented as physically inscribed, while in that shown in Fig. III, only portions of the parallels are inscribed in their relation to the zone borders, the means for noting the latitude of any unit of area being the scale-piece capable of physical movement across the chart in the proper direction of curvature, corresponding to imaginary parallels; while in Fig. II, the said means are represented as respectively stationary with relation to the chart and comprise the two numbered strips at top and bottom of the figure, which strips may be either physically separate from the chart and secured in proper relation thereto, or may be actually imprinted upon the same piece of material as the chart itself. It will also be noted that while the longitude band is appropriately described as independent of the chart, having reference to its capacity for universal use by adjustment in different positions, such independence is not to be understood as necessarily implying permanent adjustability of the latitude band with relation to the chart. In other words, when the band has been bisected either physically or theoretically at a given longitude, it may for all practical purposes be permanently fastened in position so far as the use of the chart for a unit of area having a given longitude is concerned.

From the foregoing statement it will be obvious that the details of my invention may be greatly varied in many respects, as, for instance, in regard to the manner of representation of the zones, the notation of the longitudinal and latitudinal positions of the units of area, and as to the mechanical means for facilitating the reading of the zone relation, and, therefore, it will be understood that I do not limit myself to the employment of any one or more of the specific details thus described. The instances shown and described are intended to be typically representative of progressive degrees of organization of a device based upon a particular principle, which I believe in itself to be new. Furthermore, I wish to state that in my claims, I employ certain terms, such as "chart," "longitude-band," etc., without any restrictive intent, these terms being used as conveniently applicable to the elements, but not indicating any necessary limitation as to form or mode of representation.

I claim:

1. In a device of the class described, the combination of a chart element displaying areas determined by longitude meridians and latitude parallels, said areas being also arranged in distinguishable zones referable to a common center; means for indicating the latitudinal positions of the respective areas; and a longitude band, independent of the chart element, and comprising sub-divisions indicated by transverse lines adapted to register with the extremities of the longitude meridians at an edge of the chart, substantially as set forth.

2. In a device of the class described, the combination of a chart element displaying areas determined by longitude meridians and latitude parallels, said areas being also arranged in distinguishable half zones referable to a common center, but being represented as progressing in only one direction of longitude from said center; means for indicating the respective latitudinal positions of said areas; and longitude bands independent of the chart element and comprising sub-divisions indicated by transverse lines adapted to register with the extremities of the longitude meridians at an edge of the chart, said sub-divisions being progressively numbered upon each band, but the direction of progress upon one being reversed with relation to the other; whereby any given area may be interchangeably used for either east or west longitude relative to the zone center.

3. In a device of the class described, the combination of a chart element displaying areas determined by longitude meridians and latitude parallels, said areas being also arranged in distinguishable zones referable to a common center; means independent of the chart element for indicating the latitude positions of the respective areas; said latitude indicating means being adapted to move in a definite path corresponding to the actual direction of the latitude parallels; and a longitude band independent of the chart element, and comprising sub-divisions indicated by transverse lines adapted to register with the extremities of the longitude meridians at an edge of the chart, substantially as set forth.

4. In a device of the class described, the combination of a chart element displaying areas determined by longitude meridians and latitude parallels, said areas being also arranged in distinguishable zones referable to a common center, but being represented as progressing in one longitude direction only from said center; means for indicating the respective latitudinal positions of said areas; and a longitude band independent of the chart element and comprising progressively numbered sub-divisions indicated by transverse lines adapted to register with the extremities of the longitude meridians at one edge of the chart, said longitude sub-divisions being duplicated upon opposite faces of said band in inverted progressive relation; and the numerals being displaced by one complete sub-division, whereby said band may be transversely severed at any line of sub-division, and the respective portions employed to designate east or west longitude from a given zone center.

In testimony whereof, I have hereunto signed my name at Philadelphia, Pennsylvania, this thirtieth day of December, 1912.

WILLIAM B. OLIVER.

Witnesses:
JAMES H. BELL,
E. L. FULLERTON.

Copies of this patent may be obtained for five cents each, by addressing the "Commissioner of Patents, Washington, D. C."